(12) United States Patent
Dietz

(10) Patent No.: US 7,296,889 B2
(45) Date of Patent: Nov. 20, 2007

(54) MAGNETIC EYEGLASS HOLDER

(75) Inventor: Dan L. Dietz, Houston, TX (US)

(73) Assignee: Gripping Eyewear, Inc., Houston, TX (US)

( * ) Notice: Subject to any disclaimer, the term of this patent is extended or adjusted under 35 U.S.C. 154(b) by 0 days.

(21) Appl. No.: 11/189,576

(22) Filed: Jul. 26, 2005

(65) Prior Publication Data

US 2006/0055866 A1    Mar. 16, 2006

Related U.S. Application Data

(60) Provisional application No. 60/592,298, filed on Jul. 29, 2004, provisional application No. 60/592,299, filed on Jul. 29, 2004, provisional application No. 60/592,315, filed on Jul. 29, 2004.

(51) Int. Cl.
*G02C 1/00*  (2006.01)
(52) U.S. Cl. .......................... 351/158; 248/902; 24/3.3
(58) Field of Classification Search ............... 351/158; 248/309.1, 90, 902; 24/3.3
See application file for complete search history.

(56) References Cited

U.S. PATENT DOCUMENTS

| 5,082,225 | A | | 1/1992 | Nespoli |
| 5,619,774 | A | * | 4/1997 | Perry ........................ 24/3.6 |
| 5,794,312 | A | | 8/1998 | O'Mahony |
| 5,975,476 | A | | 11/1999 | Mancinelli |
| 6,168,273 | B1 | | 1/2001 | Dupraz et al. |
| 6,367,126 | B1 | | 4/2002 | Rivkin |
| 2002/0131016 | A1 | | 9/2002 | Newler |
| 2004/0237262 | A1 | * | 12/2004 | Arnone ...................... 24/10 R |

* cited by examiner

*Primary Examiner*—Huy Mai
(74) *Attorney, Agent, or Firm*—Fulbright & Jaworski; Jan K. Simpson

(57) ABSTRACT

The invention is directed to a magnetic eyeglasses holder that includes a spring clip formed from wire and configured for attaching to an object. A base is attached to the clip in which the base has a least one magnet. The magnet allows for attractive magnetic communication with each temple bar of an eyeglasses such that when folded the eyeglasses are held in place on the holder. The magnet can be partially positioned within at least one recess in the base and the magnet can be fixed in the recess or rotate within the recess.

11 Claims, 10 Drawing Sheets

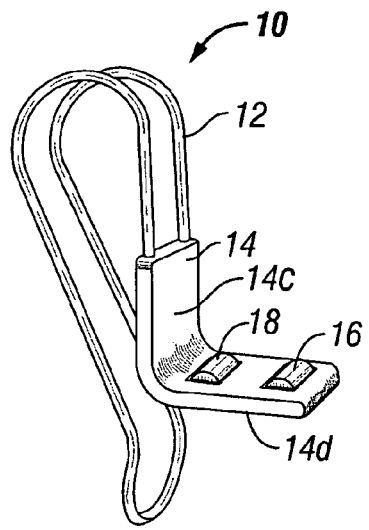
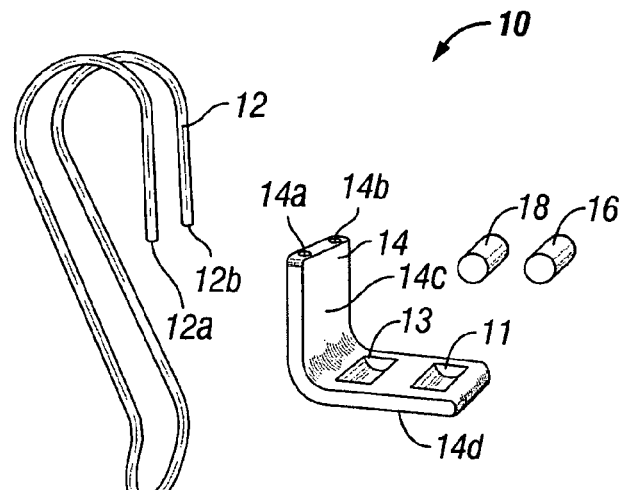
FIG. 5  FIG. 6
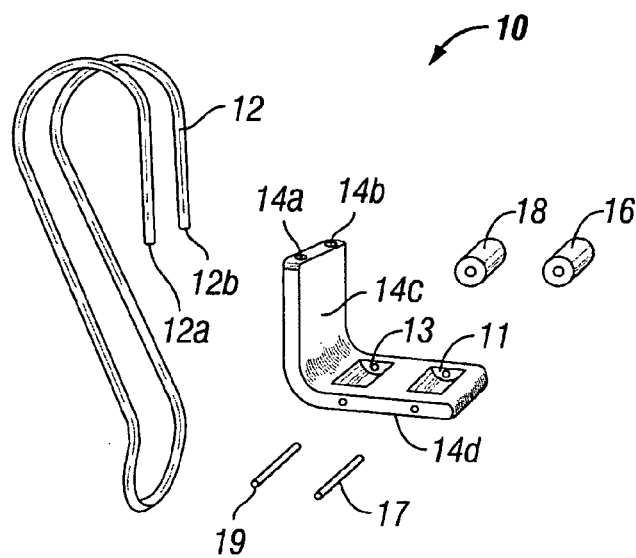
FIG. 7

MAGNETIC EYEGLASS HOLDER

CROSS-REFERENCE TO RELATED APPLICATIONS

This application claims priority to U.S. Provisional Application Nos. 60/592,298; 60/592,299 and 60/592,315, all filed Jul. 29, 2004.

TECHNICAL FIELD

The present invention is directed to eyeglasses holders and more particularly to magnetic eyeglass holders.

BACKGROUND OF THE INVENTION

Typical eyeglasses consist of a frame body that houses two lenses on either side of a nose piece. Attached to the frame body are two temple bars that extend from two ends of the frame body. The temple bars pivot between an open position perpendicular with the frame body and a closed position parallel with the frame body. Sometimes attached to the temple bars are separate ear pieces, or temple tips. The temple bars and nose piece support the frame on the head of the wearer.

Individuals often remove their eyeglasses temporarily. They may put them down and not recall where, they may hang them around their neck where they bounce against their chest, or they may put them in a pocket and have them fall out and/or get damaged.

To solve this problem, the prior art teaches using mechanical clasps to clip eyeglasses to a garment worn by the user. These are cumbersome and, like all mechanical clasps, may come loose. Some mechanical clasps also depend on the availability of a shirt pocket, a cap visor, belt, holder, straps, or the like. In addition, clips may work well initially, but fatigue can cause metal clips to weaken and lose their ability to hold eyeglasses securely. Moreover, clips can break, thereby causing the eyeglasses to come loose, fall and break, or be lost.

The use of magnets on eyeglass frames for various purposes is also well known in the art. For example, a number of eyeglass frames have magnets that magnetize the wearer for health benefits. Other eyeglass frames use magnets to hold eyeglass frame sections together, thereby facilitating disassembly and reassembly in a new configuration, with auxiliary frames, lenses, or the like.

BRIEF SUMMARY OF THE INVENTION

The present invention is directed to a magnetic eyeglasses holder that includes a clip configured for attaching to an object and a base attached to the clip, wherein the base has a least one magnet. The at least one magnet allows for attractive magnetic communication with each temple bar of an eyeglasses such that when folded the eyeglasses are held in place on the holder. The clip may be a spring clip formed from wire and has first and second ends configured for insertion into an end of the base.

The base can include at least two spaced apart magnets, wherein the magnets are partially positioned within at least one recess in the base. The magnet can be fixed in the recess or rotate within the recess.

The magnet may have a cylindrical shape or it may be a rectangular shaped post extending outwardly from the base.

The magnet may also extend through the base providing for attractive magnetic communication on both sides of the base.

The base may include a first planar section and a second planar section in which the second section is at an angle in relation to the first section, wherein the angle may be about 90°. A magnet can be positioned on the second planar section such that the magnet is offset from the clip.

The base can include a rotator rotationally engaged with the base and the rotator may include the at least one magnet or two magnets. The magnet may be set in the rotator, may be free to rotate within the rotator or may extend through the rotator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a perspective view of an alternate embodiment of the base of the holder of FIG. 2;

FIG. 6 is an exploded perspective view of the base of the holder of FIG. 5

FIG. 7 is an exploded perspective view of an alternative holder of the magnetic eyeglasses holder of FIG. 5;

DETAILED DESCRIPTION OF THE INVENTION

Figure 1:
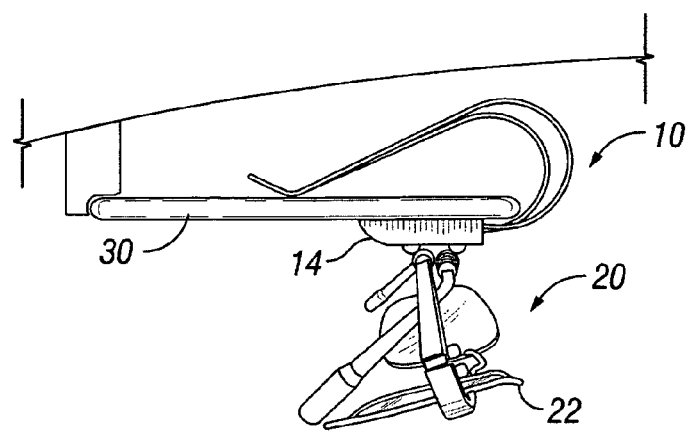
FIG. 1 and FIG. 1A are side elevation views of a magnetic eyeglasses holder of the present invention holding a set of eyeglasses onto an automobile visor.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

FIGS. 1-5 illustrate a magnetic eyeglasses holder of the invention comprising a holder 10 for holding a set of eyeglasses 20 onto a support 30. As shown in FIG. 1, the support may be the visor of an automobile. The support 30 may also be any other support onto which it is desired to hold the eyeglasses 20. For example, the support 30 may be an article of clothing, a hat, a belt, a waistband, or any other suitable support 30 for holding the eyeglasses 20 when not in use.

The magnetic eyeglasses holder 10 comprises a clip 12 for engagement with the support 30. In the example shown in FIGS. 1-5, the clip 12 comprises a clip that clips around at least a portion of the support 30. In a preferred embodiment, the clip is a spring clip formed of wire and is generally U-shaped. The clip 12 may also clip around the entire support 30. The clip 12 as shown may disengage the support 30 by sliding the clip 12 off the support 30. The clip 12 may also be any other suitable device for engagement with the support 30, such as a mechanical clip or other suitable device. The clip 12 need not be capable of sliding disengagement with the support 30, but may disengage the support 30 by any suitable means.

Figure 2:
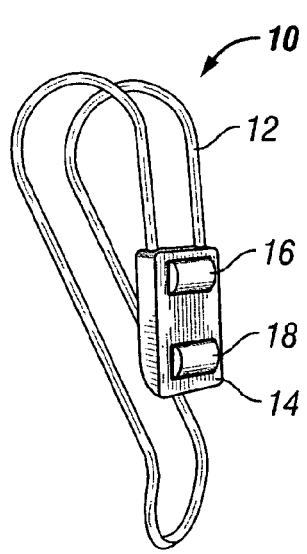
FIG. 2 is a perspective view of the holder of the magnetic eyeglasses holder shown in FIG. 1.
Figure 2A:
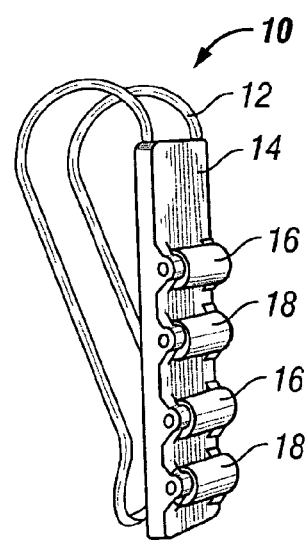
FIG. 2A is a perspective view of an alternative holder of the magnetic eyeglasses holder shown in FIG. 1.
Figure 3:
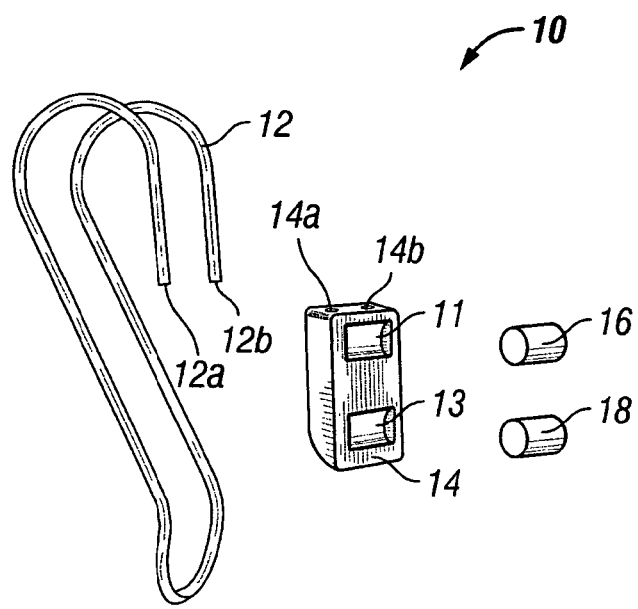
FIG. 3 is an exploded perspective view of the holder of the magnetic eyeglasses holder shown in FIG. 1.
Figure 4:
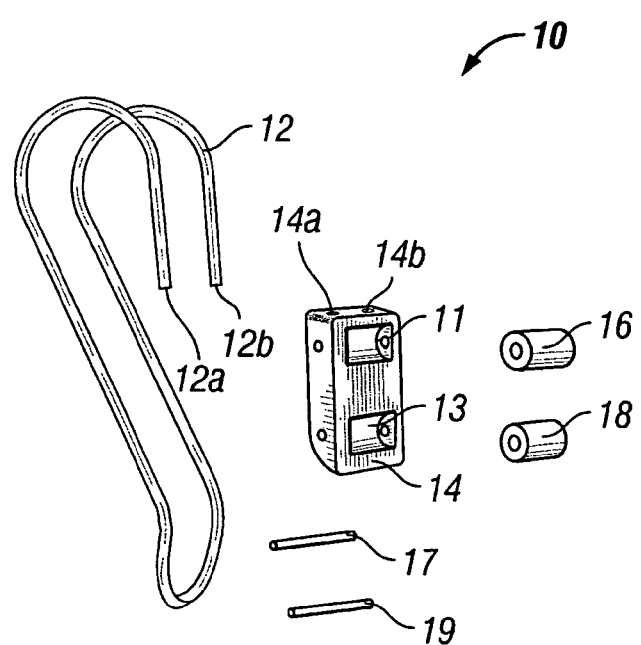
FIG. 4 is an exploded perspective view of an alternative holder of the magnetic eyeglasses holder of FIG. 1.

As shown in FIG. 2, the holder 10 also comprises a first clip attraction means such as a clip magnet 16 and a second clip attraction means such as a magnet 18 on a base 14 engaged with the clip 12. Alternatively, the clip magnets 16, 18 can be formed from a non-magnetic ferrous material that would attract magnets on the temple bars of eyeglasses. In a preferred embodiment, the magnets 16, 18 are generally cylindrical in shape. There may also be more than two magnets 16, 18 on the base 14 as shown in FIG. 2A. The clip 12 attaches to the base 14 by engaging the clip ends 12a, 12b with the base slots 14a, 14b as shown in FIGS. 3 and 4. Alternatively, the holder 10 need not comprise the base 14. Instead, the magnets 16, 18 may engage the clip 12 directly or indirectly without the base 14. As shown best in FIG. 3, the magnets 16, 18 may at least partially fit within a first recess 11 and second recess 13, respectively. The magnets 16, 18 may be directly mounted in the recesses 11, 13 as shown in FIG. 3 or may be mounted in the recesses 11, 13 using the pins 17, 19 shown in FIG. 4. The magnets 16, 18 may also be set in the recesses 11, 13 or may be free to rotate within the recesses 11, 13.

Alternatively as illustrated in FIGS. 5-7, the base 14 can include a first base or planar section 14c and a second base or planar section 14d. The second base section 14d is at an angle relative to the first base section 14c such that the magnets 16, 18 are offset from the clip 12. The angle of the second base section 14d relative to the first base section 14c is preferably approximately 90 degrees. However, the angle between the second base section 14d and the first base section 14c may be any amount. In this embodiment, the magnets 16, 18 are positioned in the second section 14d. Except for the angled base 14 and the placement of the magnets 16, 18 the embodiment of FIGS. 5 and 6 is the same as the embodiment illustrated in FIGS. 2 and 3 and the embodiment of FIG. 7 is the same as the embodiment illustrated in FIG. 4.

Figure 1A:
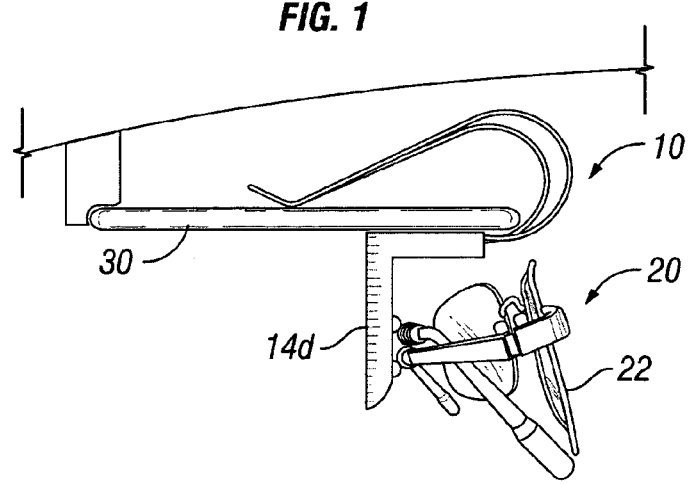
Figure 8:
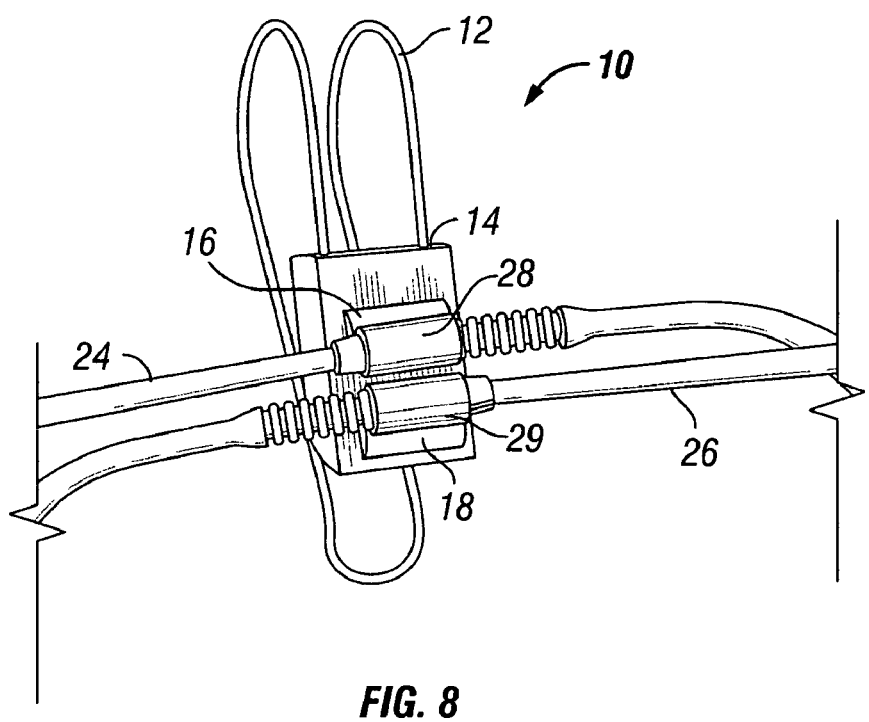
FIG. 8 is a perspective view of the holder and temple bars of the eyeglasses of the magnetic eyeglasses holder of FIG. 1.
Figure 9:
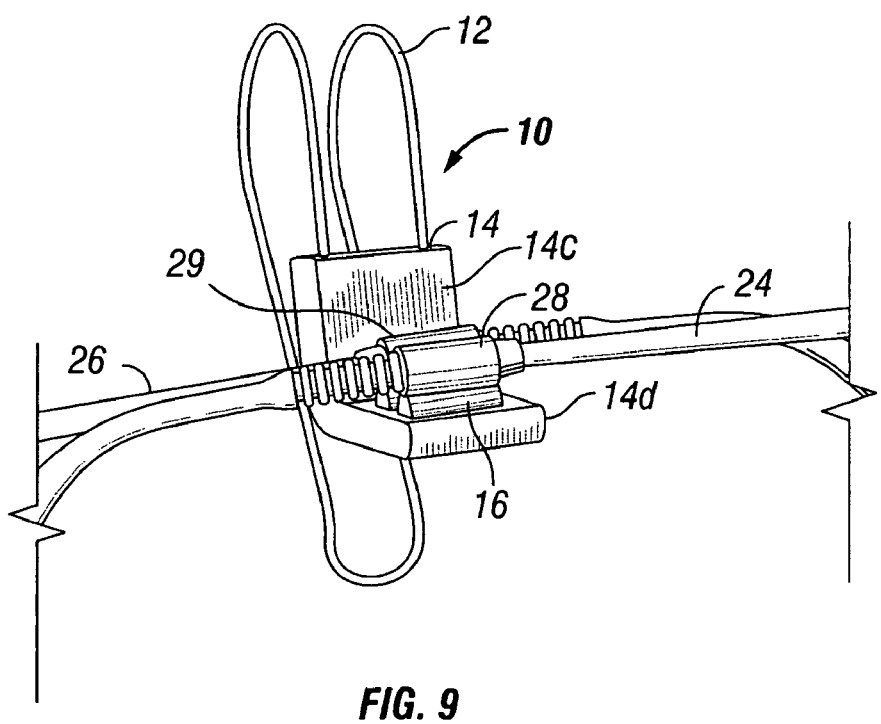
FIG. 9 is a perspective view of the holder and temple bars of the eyeglasses of the magnetic eyeglasses holder of FIG. 5.

As shown in FIGS. 1 and 1A, the holder 10 holds a set of eyeglasses 20 to the support 30. The eyeglasses 20 comprise a frame 22 as well as temple bars 24 and 26 shown in FIGS. 8 and 9 attached to the eyeglasses 20. The temple bars 24, 26 comprise temple bar magnets 28 and 29, respectively. The temple bars 24, 26 may also comprise more than one temple bar magnets 24,26. The temple bar magnets 28, 29 may engage the temple bars 24, 26 by any suitable means. As shown in FIGS. 8 and 9, the temple bar magnets 28, 29 engage the outside to the temple bars 24, 26. The temple bar magnets 28, 29 may also attach to only one side of the temple bars 24, 26. The temple bar magnets 28, 29 may also be inserted into or through the temple bars 24, 26. The temple bar magnets 28, 29 may also be at least part of the temple bars 24, 26 and may also be the temple bars 24, 26 themselves. Alternately, the temple bars may be made of a non-magnetic ferrous material which is attracted to the magnets 16, 18 of the base 14.

Figure 7A:
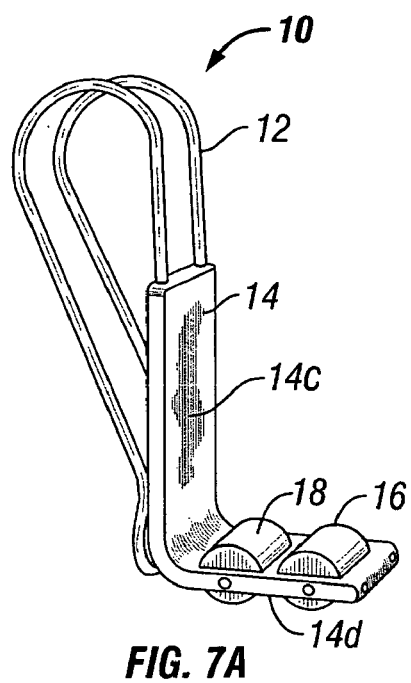
FIG. 7A is perspective view of an alternative holder of the magnetic eyeglasses holder of FIG. 5.
Figure 7B:
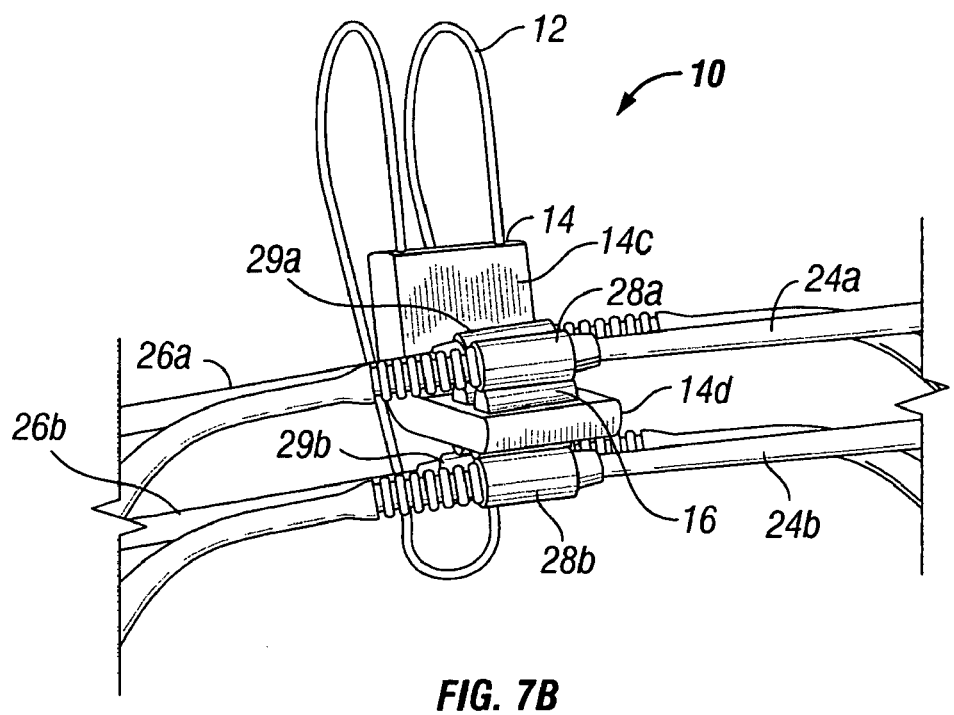
FIG. 7B is a perspective view of the holder and temple bars of the eyeglasses of the magnetic eyeglasses holder of FIG. 7A.

In FIG. 7A, the clip magnets 16, 18 are shown extending through the base 14d. In this embodiment, the clip magnets 16, 18 may attract and hold the temple bar magnets 28b, 29b of the temple bars 24b, 26b of a second set of eyeglasses 20 on the other side of the base 14d (FIG. 7B). There may also be more than one set of clip magnets 16, 18 that extend through the base 14d so that more than two sets of glassed 20 may be held by this holder.

As shown in FIGS. 8 and 9, the clip magnet 16 may attract and hold the temple bar magnet 28 and the clip magnet 18 may attract and hold the temple bar magnet 29. The clip magnets 16 and 18 may be separated enough such that the temple bar magnet 28, 29 are not in contact with each other when engaged with the clip magnet 16, 18. At least one of the clip magnets 16, 18 and the temple bar magnets 28, 29 should comprise a magnet. Either clip magnets 16, 18 may attract either temple bar magnets 28, 29. Through the attraction between the clip magnet 16, 18 and the temple bar magnet 28, 29, the holder 10 may hold the eyeglasses and thus the holder 10 may hold the eyeglasses 20 onto the support 30.

Figure 10:
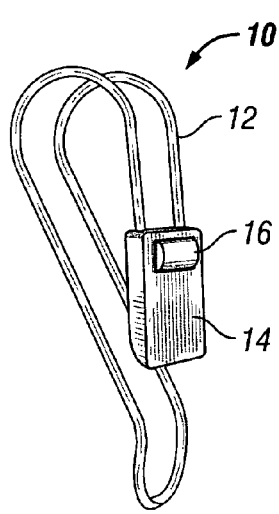
FIG. 10 is a perspective view of a holder of another embodiment of a magnetic eyeglasses holder.
Figure 11:
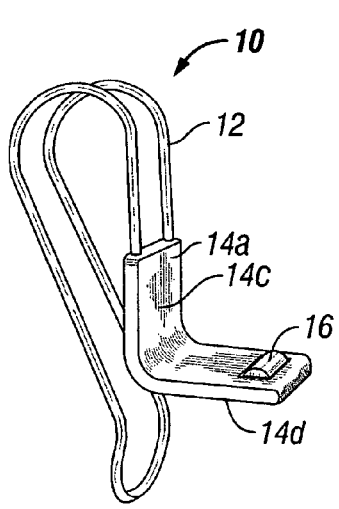
FIG. 11 is a perspective view of a holder of an alternate embodiment of a magnetic eyeglasses holder of FIG. 10.

FIGS. 10 and 11 illustrate a second embodiment of a base 14A having only the clip magnet 16 and not the second clip magnet 18. The base 14A operates as does the base 14 described above. In FIG. 11, the base 14A has a first section 14c and a second section 14d wherein the one clip magnet 16 is positioned on the base section 14d.

Figure 12:
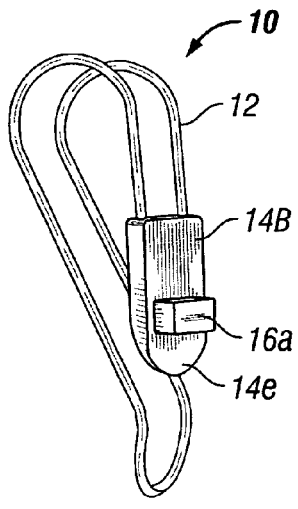
FIG. 12 is a perspective view of a holder of a third embodiment of a magnetic eyeglasses holder.
Figure 13:
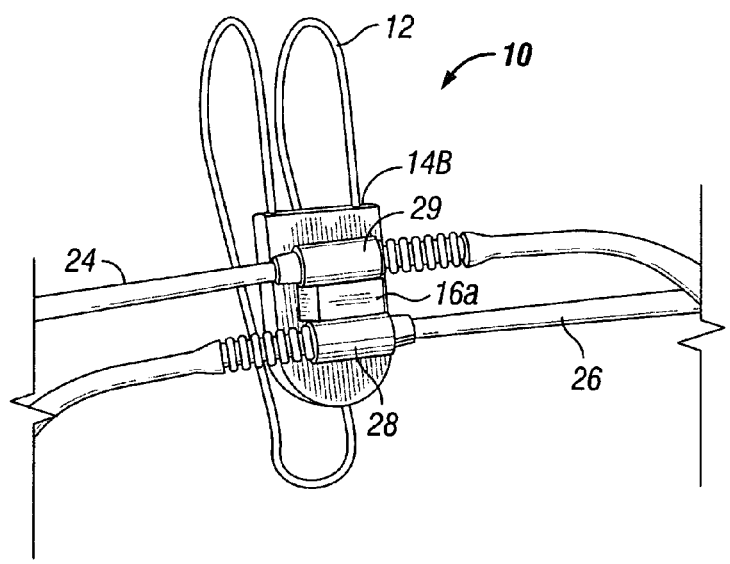
FIG. 13 is a perspective view of the holder and temple bars of the eyeglasses of the magnetic eyeglasses holder in FIG. 12.
Figure 14:
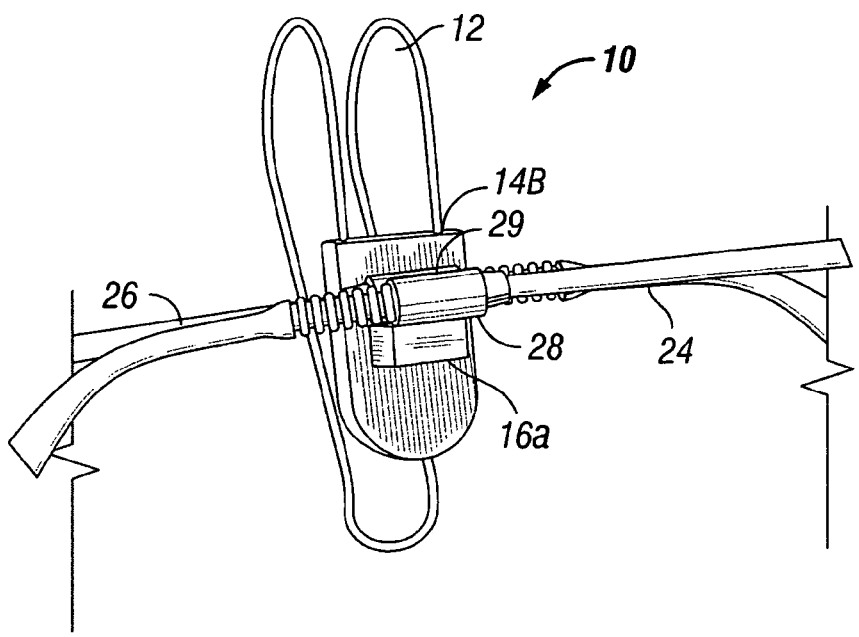
FIG. 14 is a perspective view of the holder and temple bars of the eyeglasses of the magnetic eyeglasses holder of FIG. 12.

FIGS. 12-14 illustrate a third embodiment of a base 14B in which there is one clip magnet 16a. The clip magnet 16a is generally a rectangular shaped post extending outwardly from the base 14B and is positioned generally in the center of base 14B. The base 14B has a rounded end 14e. Alternatively, the clip magnet 16a may be formed from a non-magnetic ferrous material. As described above, the clip magnet 16a attracts at least one of the temple bar magnet 28, 29 of the temple bars 24, 26 to hold the eyeglasses 20 onto the support 30.

The clip magnet 16a may attract the temple bar magnet 28, 29 such that the temple bars 24, 26 are located on either side of the clip magnet 16a as shown in FIG. 13. The clip magnet 16a may also attract at least one of the temple bar magnets 28, 29 such that the temple bars 24, 26 are both on one side of the magnet 16a as shown in FIG. 14.

Figure 15:
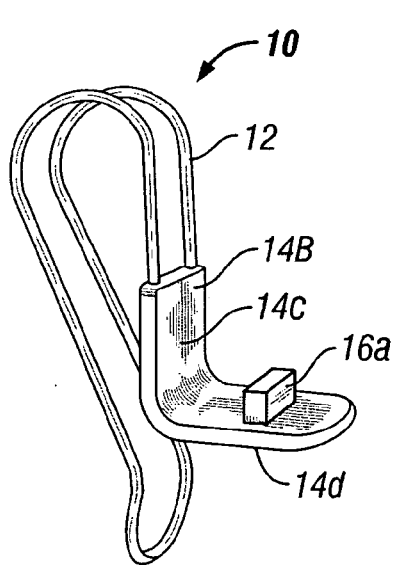
FIG. 15 is a perspective view of a holder of an alternate embodiment of a magnetic eyeglasses holder of FIG. 12.
Figure 16:
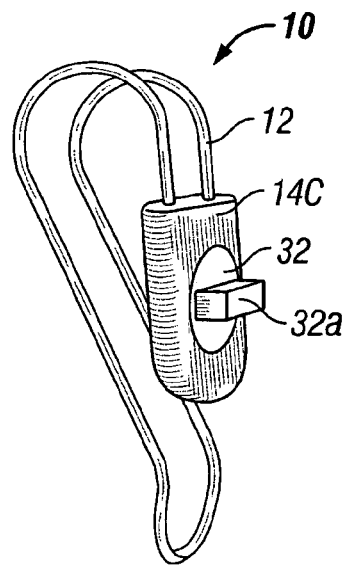
FIG. 16 is a perspective view of a fourth embodiment of the holder of the magnetic eyeglasses holder.
Figure 17:
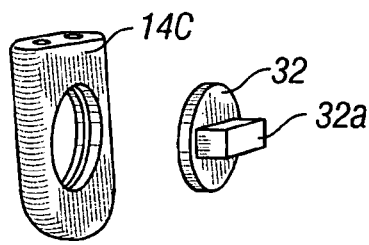
FIG. 17 is an exploded perspective view of the base of the holder of FIG. 16.

Alternatively, as illustrated in FIG. 15, the base 14B can be angled in which the base 14B has a first section 14c and a second section 14d wherein the one clip magnet 16a is positioned on the second section 14d.

FIGS. 16-21 illustrate a fourth embodiment in which base 14C includes a clip magnet 32a extending from a rotator 32. The rotator 32 is rotationally engaged with the base 14C. Thus, the rotator 32 and clip magnet 32a are free to rotate relative to the base 14C and the clip 12. Alternatively, the clip magnet 32a may be formed from a non-magnetic ferrous material. There may also be more than one clip magnet 32a on the rotator 32. There may also be more than one rotator 32 and clip magnet 32a on the base 14C. The clip magnet 32a and rotator 32 may be an integral unit or may be separate elements. As shown best in FIG. 17, the base 14C may comprise a cavity 14c into which the rotator 32 is installed. The rotator 32 may be engaged with the base 14C by any suitable means that allows the rotator 32 to rotate, such as a snap-fit or crimped lip along the edge of the cavity 14c. The rotator 32 may be a magnet or a non-magnetic ferrous material. The rotator 32 may also be any other suitable material such as plastic.

Figure 18:
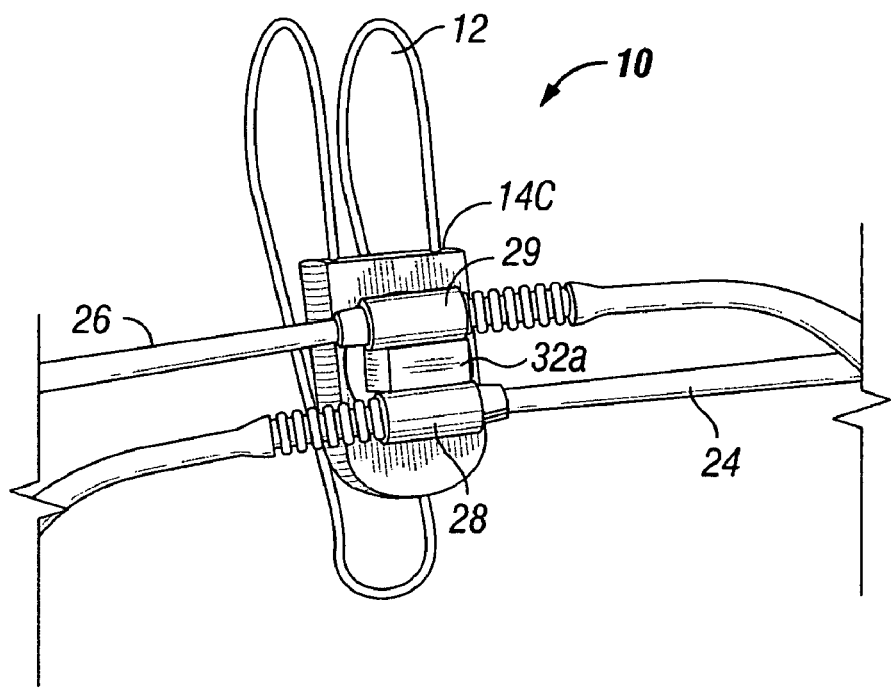
FIG. 18 is a perspective view of the holder and temple bars of the eyeglasses of the magnetic eyeglasses holder of FIG. 16.
Figure 19:
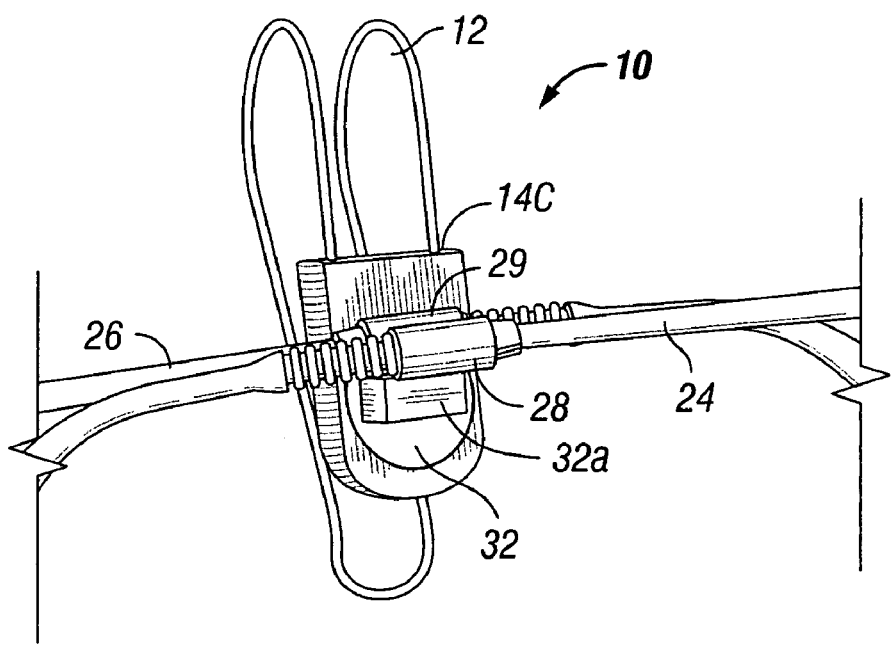
FIG. 19 is an alternate perspective view of the holder and temple bars of the eyeglasses of the magnetic eyeglasses holder of FIG. 16.
Figure 20:
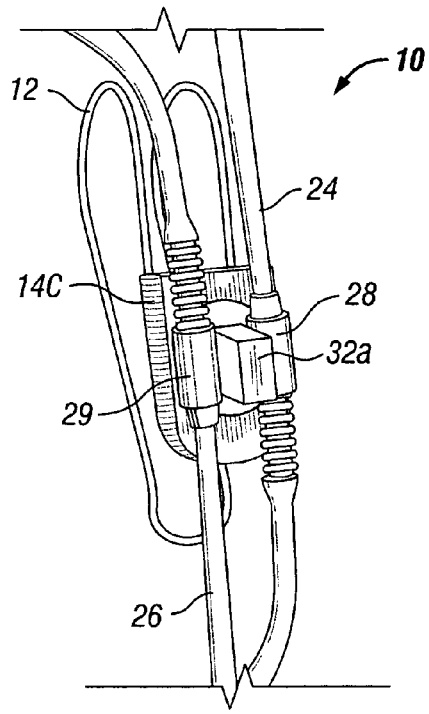
FIG. 20 is an alternate perspective view of the holder and temple bars of the eyeglasses of the magnetic eyeglasses holder of FIG. 16 in a rotated position.
Figure 21:
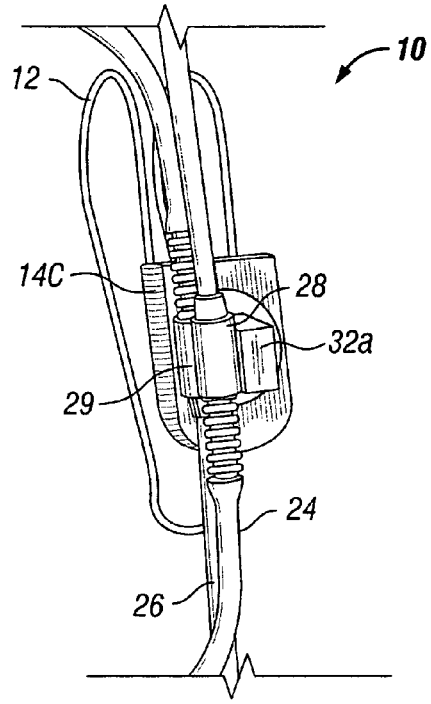
FIG. 21 is an alternate perspective view of the holder and temple bars of the eyeglasses of the magnetic eyeglasses holder of FIG. 16 in a rotated position.

The eyeglasses 20 can be attached as is illustrated in FIGS. 18 and 19. As shown in FIGS. 20-21, because the rotator 32 and thus the clip magnet 32a, are free to rotate, the temple bars 24, 26 may be positioned anywhere within the 360 degrees of rotation. The eyeglasses 20 may thus be positioned as best suited depending on the orientation of the holder 10 and the orientation of the support 30.

Figure 22:
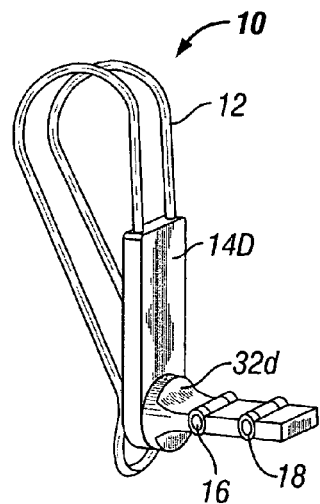
FIG. 22 is a perspective view of a fifth embodiment of the holder of the magnetic eyeglasses holder of the present invention.

FIG. 22 illustrates a fifth embodiment of a base 14D in which a rotator 32d extends at a generally right angle to the base 14D. The clip magnets 16, 18 may be set in the rotator 32d or may be free to rotate within the rotator 32d. In addition, the clip magnets 16, 18 may extend through the rotator 32d and thus be exposed on both sides of the rotator 32d. The rotator 32d is at an angle relative to the base 14D such that the clip magnets 16, 18 are offset from the clip 12. The angle of the rotator 32e relative to the base 14 shown in FIG. 22 is approximately 90 degrees. However, the angle between the rotator 32d and the base 14D may be any amount.

Figure 23:
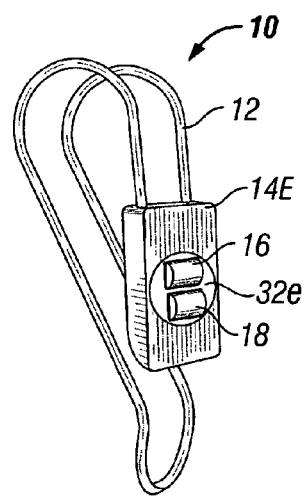
FIG. 23 is a perspective view of a sixth embodiment of the holder of the magnetic eyeglasses holder of the present invention.
Figure 24:
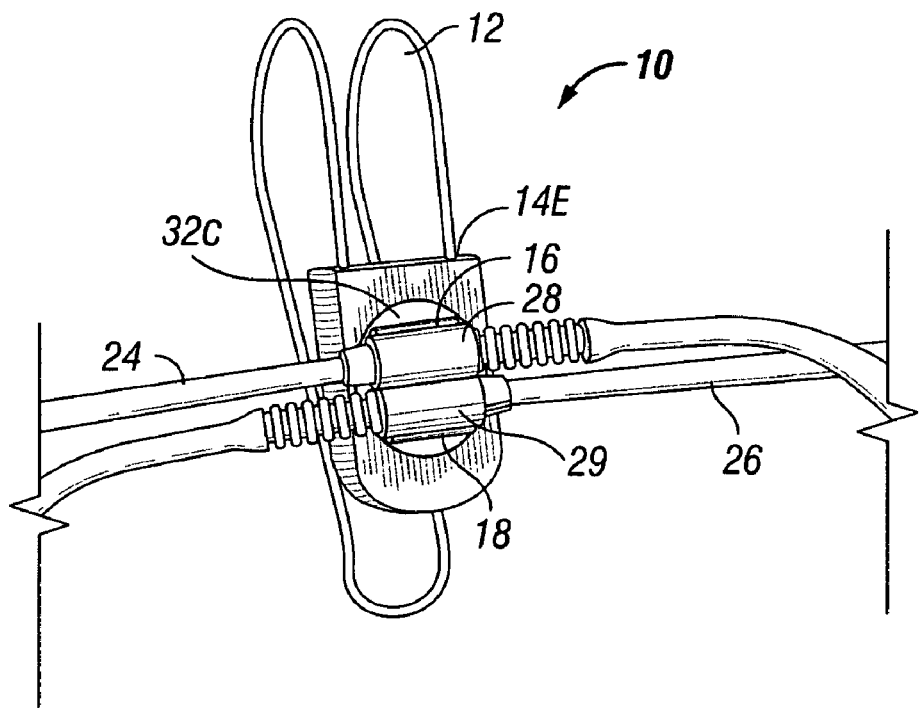
FIG. 24 is a perspective view of the holder and temple bars of the eyeglasses of the magnetic eyeglasses holder of FIG. 23.
Figure 25:
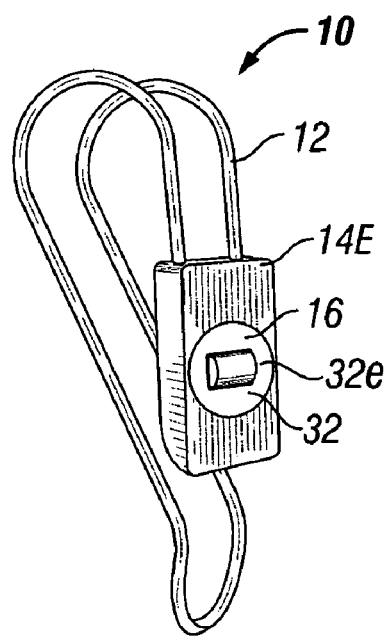
FIG. 25 is a perspective view of an alternate embodiment of the holder of FIG. 23.

FIGS. 23 and 24 illustrate a sixth embodiment of the base 14E. The base 14E includes a first clip magnet 16 and a second clip magnet 18 on a rotator 32e. There may also be more than two clip magnets 16, 18 on the rotator 32e. The clip magnets 16, 18 may be set in the rotator 32e or may be free to rotate within the rotator 32e. The eyeglasses 20 can be attached as is illustrated in FIG. 24. Alternatively, there can be only one clip magnet 16 on the rotator 32e as illustrated in FIG. 25.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A magnetic eyeglasses holder comprising:
   a spring clip configured for attaching to an object;
   a base attached to the clip, the base having two spaced apart magnets;
   wherein the two magnets allows for attractive magnetic communication with each temple bar of an eyeglasses such that when folded the eyeglasses are held in place on the holder between the two magnets.

2. The holder of claim 1, wherein the spring clip formed from wire.

3. The holder of claim 1, wherein the clip has first and second ends configured for insertion into an end of the base.

4. The holder of claim 1, wherein the base includes the two spaced apart magnets.

5. The holder of claim 1, wherein the magnet is partially positioned within at least one recess in the base.

6. The holder of claim 5, wherein the magnet is fixed in the recess or rotates within the recess.

7. The holder of claim 1, wherein the magnet has a cylindrical shape.

8. The holder of claim 1, wherein the magnet extends through the base whereby providing for attractive magnetic communication on both sides of the base.

9. A magnetic eyeglasses holder comprising:
 a clip configured for attaching to an object, the clip being a spring clip formed from wire;
 a base attached to the clip, the base having two spaced apart magnets cylindrical in shape;
 wherein the two magnets allow for attractive magnetic communication with each temple bar of an eyeglasses such that when folded the eyeglasses are held in place on the holder between the two spaced apart magnets.

10. The holder of claim 9, wherein the magnets are partially positioned within at least one recess in the base.

11. The holder of claim 10, wherein the magnets are fixed in the recess or rotates within the recess.

* * * * *